United States Patent [19]
Lewis et al.

[11] Patent Number: 5,361,315
[45] Date of Patent: Nov. 1, 1994

[54] REFRACTIVE ELEMENT OPTICAL TRANSMISSION SWITCH

[75] Inventors: Warren H. Lewis, Elizabethtown, Pa.; Gregory B. Powers, Maple Valley, Wash.

[73] Assignee: The Whitaker Corporation, Wilmington, Del.

[21] Appl. No.: 41,434

[22] Filed: Mar. 31, 1993

[51] Int. Cl.$^5$ ................................................ G02B 6/26
[52] U.S. Cl. ........................................ 385/16; 385/18; 385/140; 385/19
[58] Field of Search ........................ 385/15–24, 385/47, 140

[56] References Cited

U.S. PATENT DOCUMENTS

| | | | |
|---|---|---|---|
| 4,239,331 | 12/1980 | Aoyama | 350/96.20 |
| 4,304,460 | 12/1981 | Tanaka et al. | 385/22 |
| 4,322,126 | 3/1982 | Minowa et al. | 350/96.20 |
| 4,329,017 | 5/1982 | Kapany et al. | 350/96.15 |
| 4,479,697 | 10/1984 | Kapany et al. | 385/18 X |
| 4,484,793 | 11/1984 | Laude | 385/22 |
| 4,932,745 | 6/1990 | Blonder | 350/96.20 |
| 5,000,534 | 3/1991 | Watanabe et al. | 350/96.20 |
| 5,028,104 | 7/1991 | Kokoshvili | 350/91.15 |
| 5,133,030 | 7/1992 | Lee | 385/16 X |
| 5,226,104 | 7/1993 | Unterleitner et al. | 385/18 X |

OTHER PUBLICATIONS

Marc Cohn and David Uken; Fiber-distributed-data-interface (FDDI) bypass switch for ruggedized applications-presented at Conference on Optical Fiber Communications/Integrated Optics and Optical Fiber Communications (OFC/IOOC'93); WG3, p. 100 of OFC/IOOC'93 Technical Digest No Month.

*Primary Examiner*—John D. Lee
*Assistant Examiner*—Phan T. Heartney
*Attorney, Agent, or Firm*—Driscoll A. Nina, Jr.

[57] ABSTRACT

An optical switch having a fixed-position concave reflector, a fixed array of optical waveguides facing the concave reflector, said array including n number of input waveguides for transmitting the optical signal into the switch, and m number of output waveguides adapted to receive the optical signal, and a refractive element located between the reflector and the array of optical waveguides having multiple angular positions for selectively coupling one of the n number of input waveguides with one of the m number of output waveguides, the switch further including an actuator connected to the refractive element for moving the refractive element between angular positions.

7 Claims, 5 Drawing Sheets

REFRACTIVE ELEMENT OPTICAL TRANSMISSION SWITCH

FIELD OF THE INVENTION

The present invention relates to an optical switch for use in optical fiber communication systems to provide selective coupling of optical transmissions between pairs of optical fiber waveguides, especially adapted for single mode waveguides.

BACKGROUND OF THE INVENTION

In optical fiber communication systems, it is often necessary to selectively switch the optical transmission emanating from one optical waveguide between alternative waveguides. Many arrangements exist for providing this type of switching.

U.S. Pat No. 4,239,331 discloses an optical switch that moves an angularly-orientated transparent plate into, and out of, the optical path between pairs of fibers on opposite sides of the plate. The signal passes through a collimating lens as it enters the switch. If the plate is not in the optical path, the signal passes to a second lens element, opposite the first element, that focuses the signal on the end of an optical fiber. If the plate is within the optical signal path, the signal path is altered by refraction into a different lens element which focuses the light on the end of another optical fiber.

U.S. Pat. No. 4,932,745 discloses an optical switch utilizing a refracting slab that is moved parallel to its sides into the path of the optical signal in order to select a different output fibers. Lens elements collimate the optical signal prior to its passing through the slab and focus the signal after being refracted, as in the '331 patent.

U.S. Pat. No. 5,000,534 discloses an optical switch that utilizes a movable planar mirror for switching the optical signal between pairs of fibers by reflection. The optical signal is collimated by a lens and then reflected by the mirror onto a second lens which focuses the signal onto an end of another optical fiber. Switching occurs by changing the angular orientation of the mirror, thereby selectively reflecting the signal through another focusing lens onto a different optical fiber.

U.S. Pat. No. 4,329,017 discloses an optical switch that uses a movable spherical reflector to effectuate switching of optical signal. Switching occurs by tilting the spherical surface so that its center of curvature is midway between the end of the fiber from which the signal emanates and the end of the fiber receiving the signal.

In the first three patents, the inventions require the use of collimating and focusing lenses in conjunction with a mirror or a refractive element. In the final patent, a movable concave reflective mirror is used without lens elements but the center of curvature of the mirror surface must be precisely located in relation to the ends of the waveguides. This alignment is especially difficult to maintain when using single mode optical fibers.

What is needed is a compact optical signal switch that may be used with single mode signal transmissions that utilizes a minimum number of precision optical components and is adjustable to compensate for optical element misalignment during assembly and set-up, thereby allowing for the use of less precisely manufactured components.

SUMMARY OF THE INVENTION

The present invention provides an optical switch for selectively switching an optical transmission emanating from an input waveguide into one of a plurality of output waveguides. The switch utilizes a fixed position, concave mirror surface facing an array of optical waveguides, including n number of input waveguides and a plurality of m output waveguides including a first output waveguide and at least a second output waveguide. A movable refractive element is located between the mirror surface and the waveguide array within the optical signal path for selectively switching the optical signal between pairs of waveguides.

Optical waveguides, as used in this application include optical fibers, planar waveguides, signal detectors and signal sources. A refractive element, having parallel major surfaces, is located between the reflector and the array of optical waveguides so that the optical signal passes through the refractive element. The refractive element is set at an angle relative to the incoming signal. At a first angular position of the refractive element, the optical signal propagates through the major surfaces of the refractive element and is reflected back through the refractive element by the reflector, into the first output waveguide. At a second angular position, the optical signal propagates through the major surfaces of the refractive element which is set to a different angle than at the first angular position, and the signal reflected back through the refractive element by the reflector, into the second output waveguide. The refractive element may have as many angular positions as necessary to transfer the signal between the desired output waveguides. An actuator moves the refractive element between angular positions.

It is an object of this invention to provide an easy to manufacture compact optical switch for selectively coupling an optical signal between an input waveguide and one of a plurality of output waveguides.

It is a feature of this invention that the optical signal remains in a noncollimated state during switching, thereby requiring fewer precision optical elements. It is another feature of this invention that the mirror surface allows the input and output waveguides to be positioned on the same side of the switch, thereby creating a compact switch. It is yet another feature of this invention that a refractive element is angularly position relative to the optical signal between the waveguides and the mirror surface to selectively couple the optical signal to various pairs of waveguides. It is a further feature of this invention that the mirror surface and the waveguide array remain in a fixed position and the refractive element moves to effect the switching.

It is an advantage of this invention that the angular orientation of the refractive plate relative the optical signal is adjustable so that the displacement the optical signal is controllable, thereby accommodating misalignment of the optical elements and allowing the use of components manufactured to a lesser precision.

A further understanding of the invention and its advantages may be realized by reference to the remaining portions of the specification and the included drawings.

DESCRIPTION OF THE INVENTION

Figure 1:
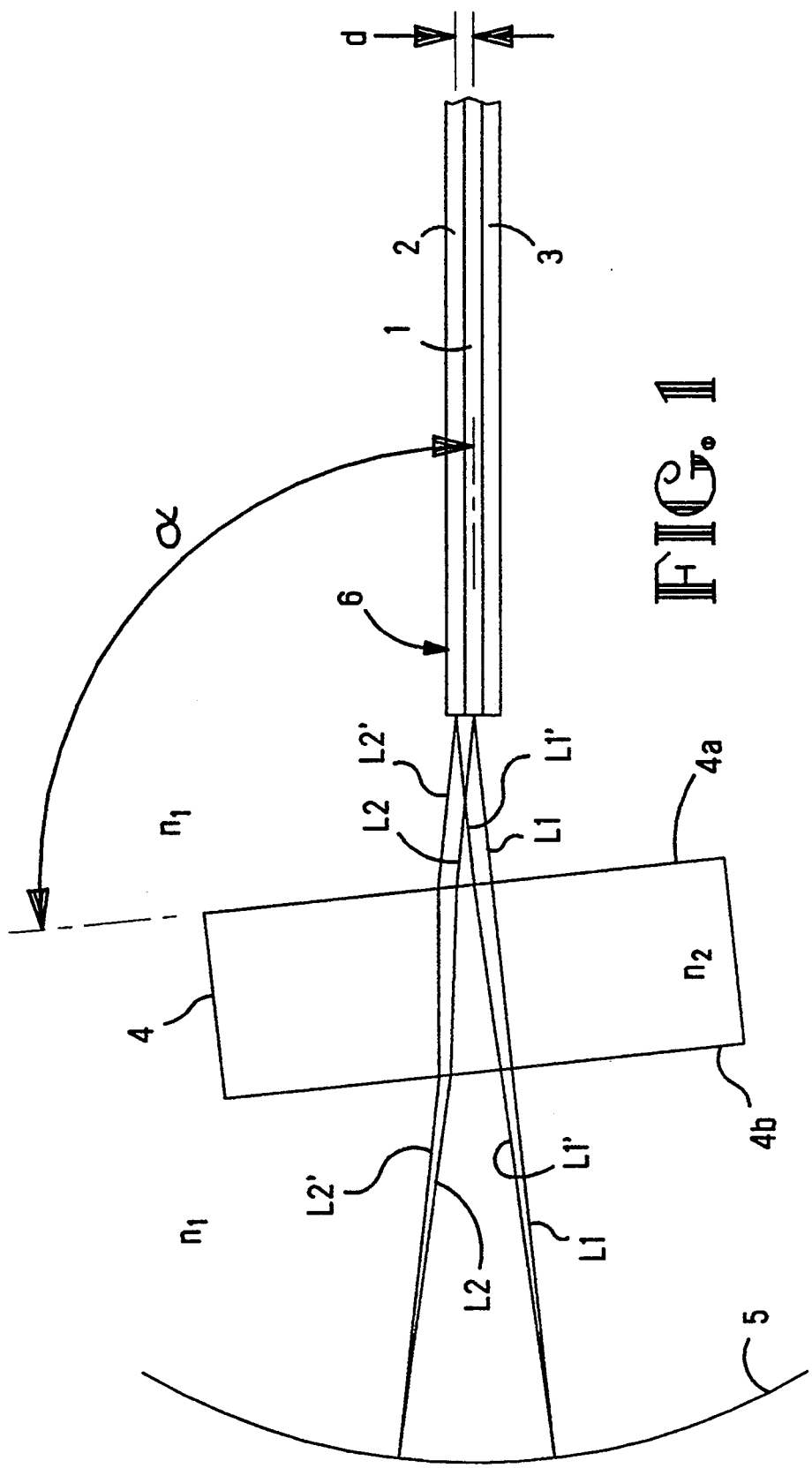
FIG. 1 is an optical schematic representation of the switch in a first angular position.
Figure 2:
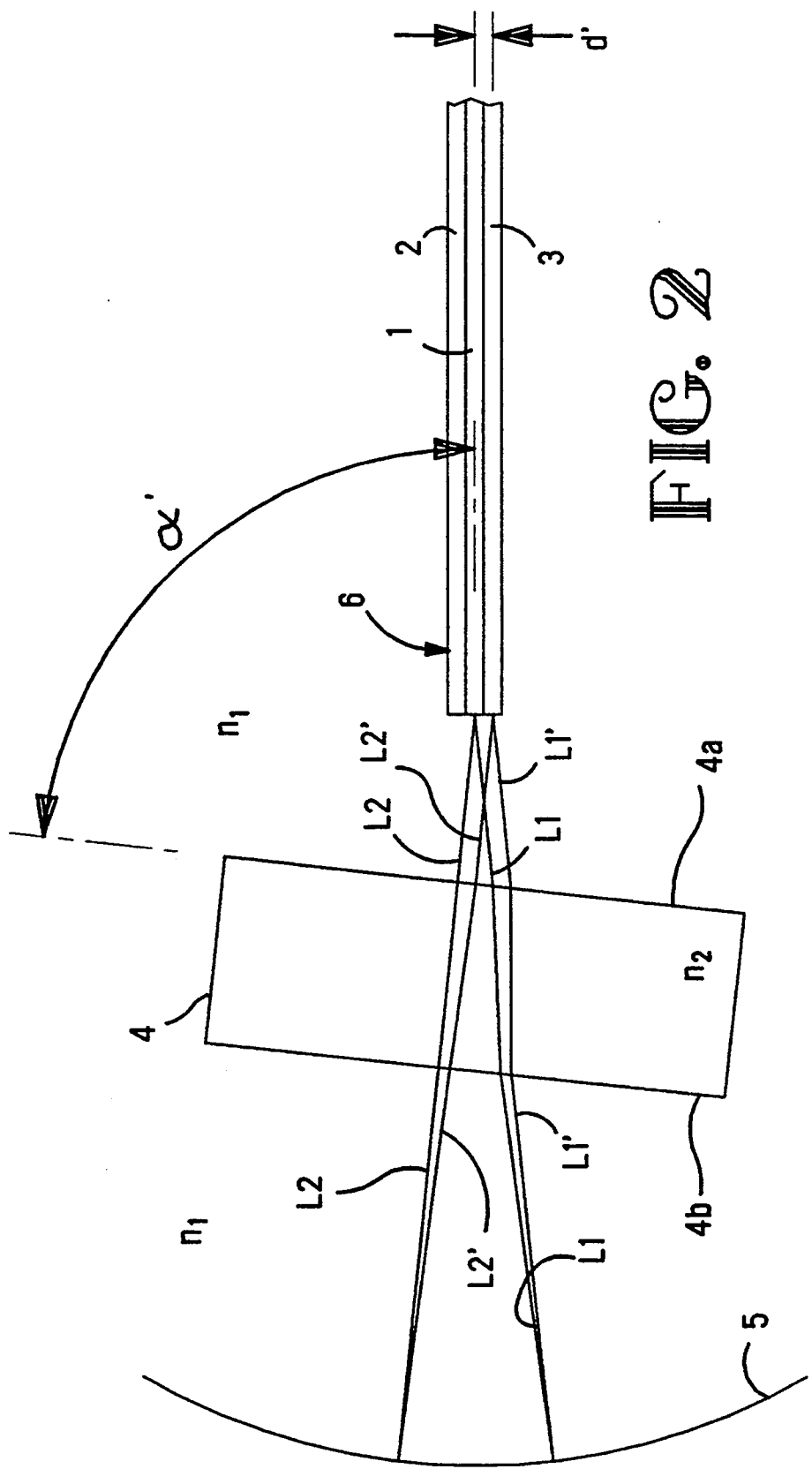
FIG. 2 is an optical schematic representation of the switch in a second angular position.

In principle, the operation of the optical switch of the present invention is based on Snell's Law of Refraction and the reflection characteristics of spherical mirrors. As most easily observed in the ray tracings of FIGS. 1 and 2, an optical signal, illustrated by rays L1 and L2, enters the switch from one of the n number of input waveguides, input waveguide 1, located in an array of optical waveguides 6 that includes the input waveguide 1 and two of the m number of output waveguides, a first output waveguide 2 and at least a second output waveguide 3. The signal L1,L2 passes through a medium of refractive index $n_1$, air for example, located between the waveguides and a refractive element 4. The signal L1,L2 is incident upon a first. planar surface 4a of refractive element 4 that has a refractive index $n_2$, which is not equal to $n_1$. The signal L1,L2 then propagates through the refractive element 4 and exits through a second planar surface 4b into the medium between the refractive element 4 and a concave reflector 5. This medium will typically be the same as on the waveguide side of the refractive element $n_1$(e.g. air). The signal L1,L2 passes through this medium and is incident upon the reflecting surface 5, where it is reflected back, illustrated by rays L1',L2', to the refractive element 4. The reflected signal L1',L2 is then incident upon the second surface 4b of the refractive element 4 and propagates through the element 4 until it exits from the first surface 4a where it propagates through the medium on the waveguide side of the refractive element 4 into one of the m output waveguides.

If the refractive element has two parallel surfaces 4a,4b through which the signal L1,L2 and L1',L2' passes, such as a plate of glass, the effect of the refractive element 4, when set at an angle $\alpha,\alpha$ (corresponding to the first angular position in FIG.1 and the second angular position in FIG. 2 respectively) to the incident signal, is to offset the reflected signal L1',L2' from the input signal L1,L2 an amount d,d' into an output waveguide 2,3. By altering the angle $\alpha,\alpha$ of the refractive element 4 relative to the incoming signal L1,L2 the amount of offset d or d may be controlled, thereby enabling the signal to be switched among the m output waveguides.

Figure 3:
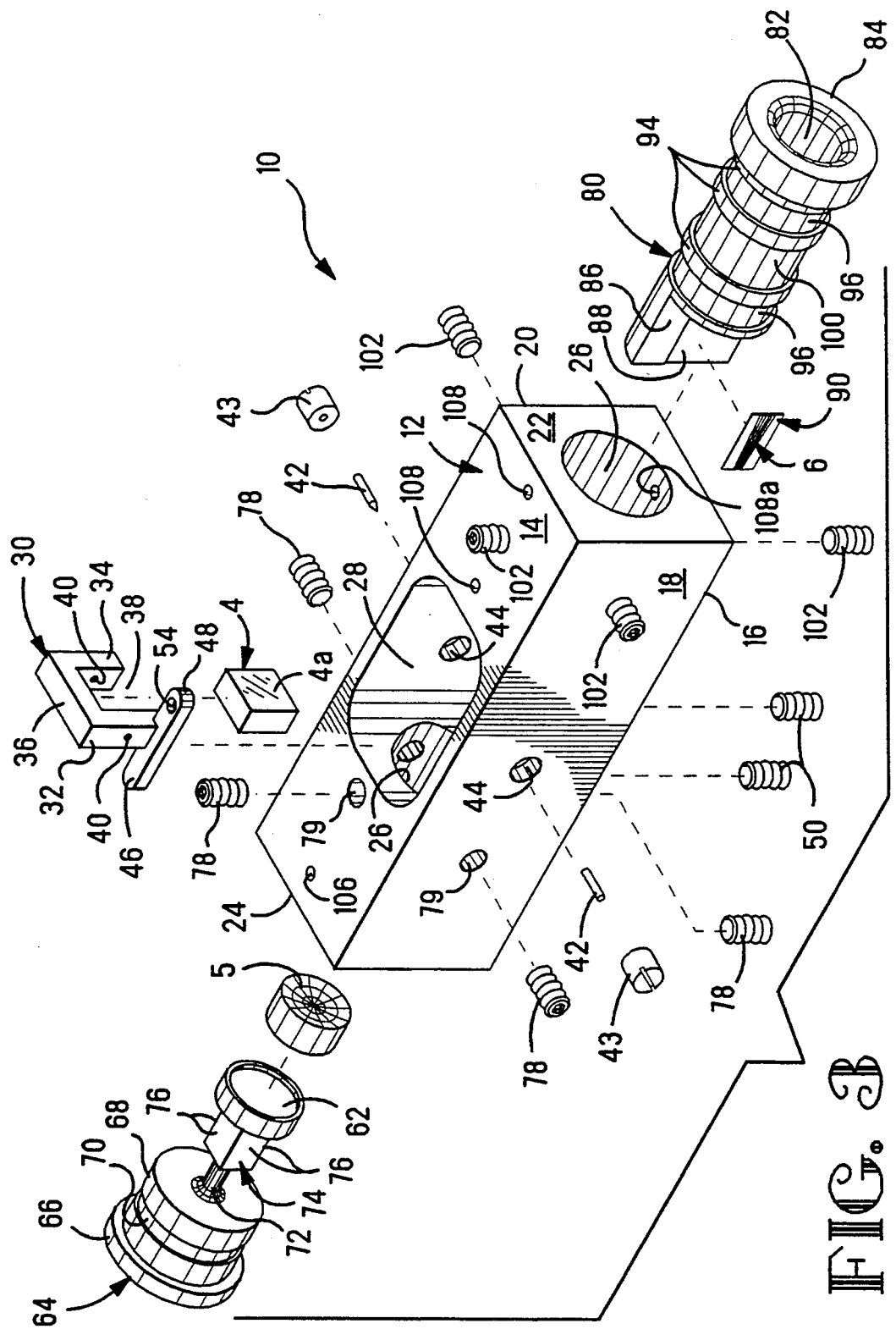
FIG. 3 is an exploded perspective view of the switch.
Figure 4:
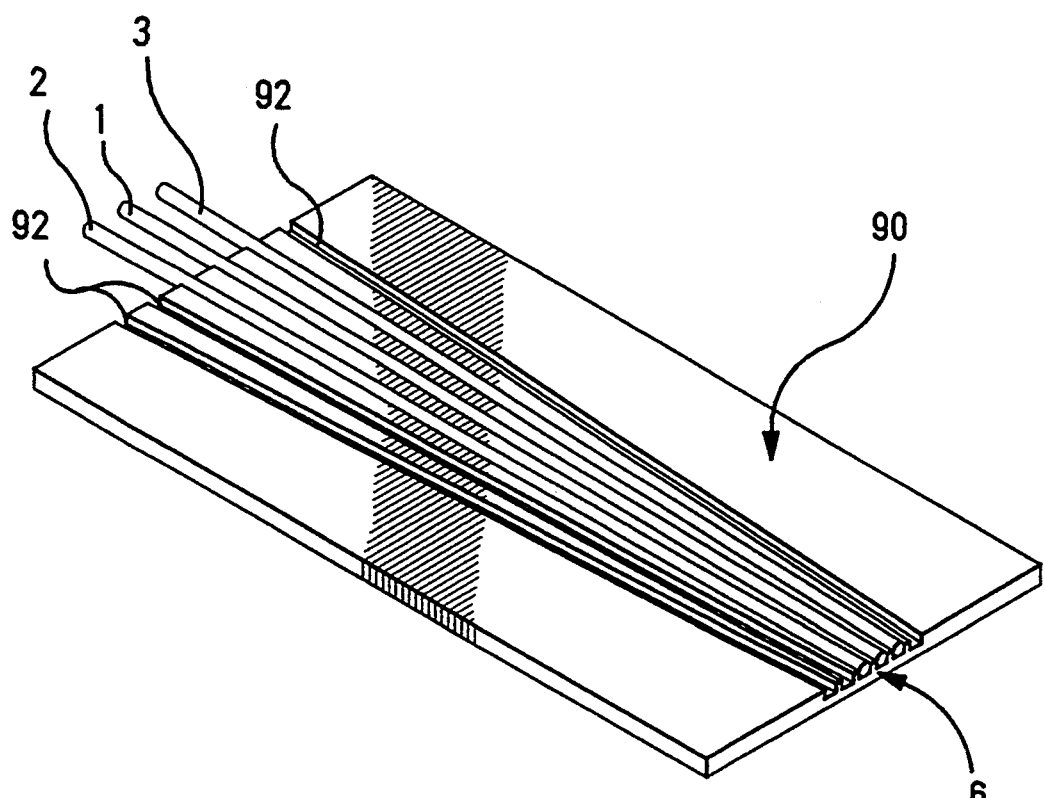
FIG. 4 is a perspective view of the precision fiber aligner shown in FIG. 3.
Figure 5:
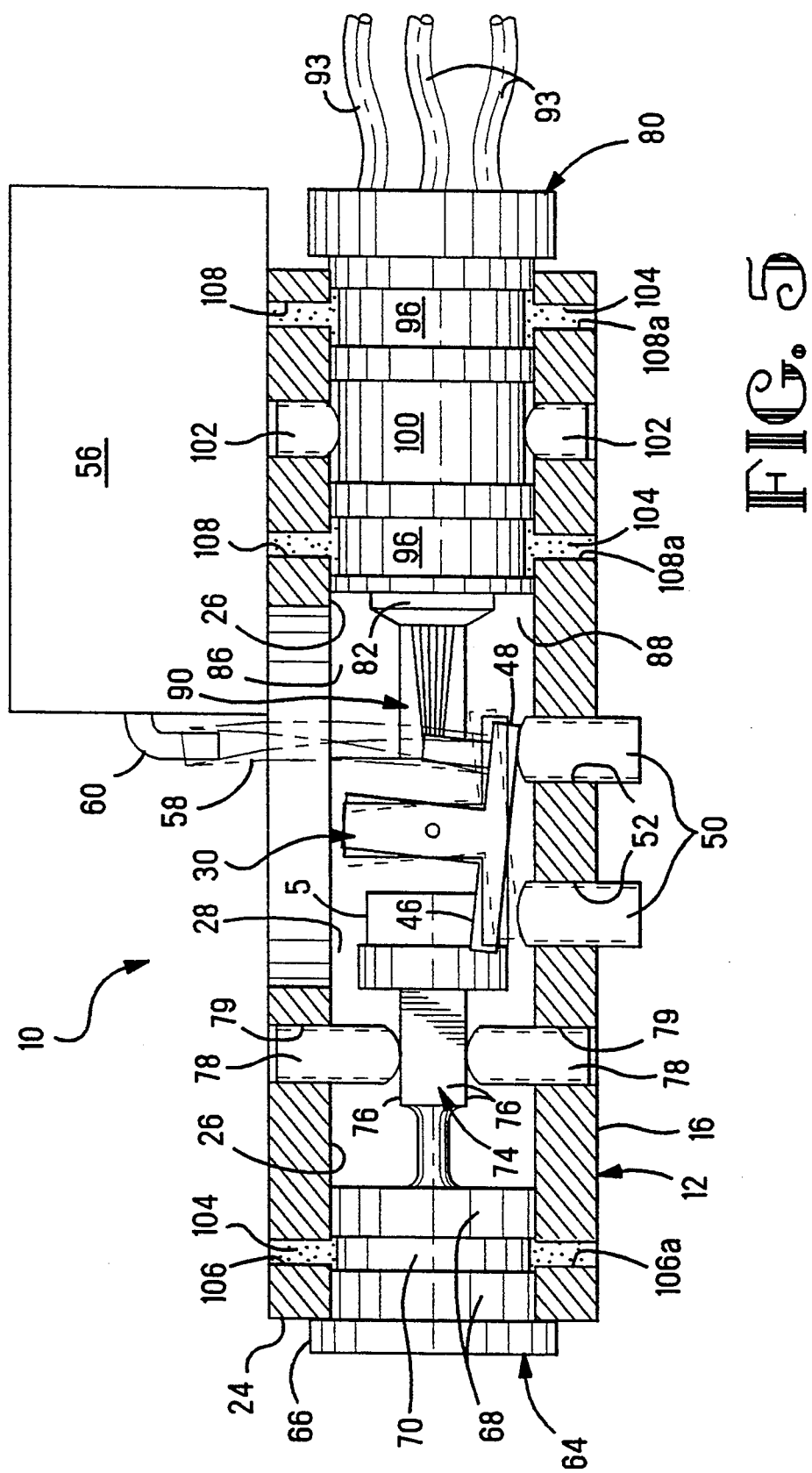
FIG. 5 is a partial cross-section of an assembled switch showing the first and second angular positions.

FIGS. 3-5 show a one-in-by-two-out ($n \times m = 1 \times 2$) optical switch of the present invention. This is the simplest of the embodiments of the switch of the present invention. In alternative embodiments, the switch can have a larger number of inputs and/or a larger number of output waveguides. This switch could also be configured to operate as a by-pass switch. The optical switch 10 has a base 12 that orients the optical components: the waveguides 1,2,3 of array 6; the refractive element 4; and the reflector 5 of the switch 10. The base 12 has a top 14, a bottom 16, two opposing sides 18,20, an array end 22 and a reflector end 24. A central bore 26 extends between the array end 22 and the reflector end 24. Between the array end 22 and the reflector end a switch cavity 28 extends from the top 14 into the base 12 encompassing the central bore 26.

Received within the switch cavity 28 is a refractive element housing 30 that holds the refractive element 4.

In this embodiment, the refractive element is a rectangular piece of optical glass having opposing and parallel major surfaces 4a,4b. In order to improve the efficiency of the switch an anti-reflection coating may be deposited on these surfaces. The refractive element housing 30 is U-shaped with opposing legs 32,34 extending from a base leg 36 defining an opening 38 for receiving the refractive element 4. A bore 40 extends through each of the opposing legs 32,34. Pivot pins 42 are press fit into the bore 40 and ride in jewel bearings 43 that are positioned in holes 44 that extend through the sides 18,20 of the base 12.

Stops 46,48 extend from one of the opposing legs 32 of the refractive element housing 30. As best seen in FIG. 5, the stops 46,48, in conjunction with set screws 50 that extend into the switch cavity 28 through tapped holes 52 in the bottom 16 of the base 12, limit the pivoting of the refractive element housing 30, thereby defining two angular positions of the refractive element 4. These two positions coincide with a first angular position of the refractive element 4 where the signal is coupled to the first output waveguide 2 and a second angular position of the refractive element where the signal is coupled to the second output waveguide 3. One of the stops 48 includes a hole 54 for interconnection with an actuator 56, an electrical relay in this embodiment, for moving the switch between the first angular position and the second angular position.

The actuator 56 is interconnected to the hole 54 in the stop 48 of the refractive element housing 30 by a tension/compression spring 58 attached to an arm 60 of the actuator 56. The purpose of the spring 58 is to accommodate the differences between the stroke of the actuator and the displacement of the refractive element housing 30 required to accomplish the switching. The spring 58 will accommodate the difference without altering significantly the amount of force exerted on the housing 30.

The reflecting surface 5 of this embodiment is a concave mirror which is bonded into a mirror seat 62 of a cylindrical pedestal 64. The pedestal 64 is of unitary construction and has an end flange 66 that is larger than the diameter of the central bore 26 and is connected to a bearing portion 68 that includes a circumferential glue ring 70. The bearing portion 68 has a close sliding fit with the central bore 26 at the reflector end 24 of the base 12. A compliant post 72 extends concentrically from the end of the bearing portion 68. The post 72 terminates into an engagement portion 74 having a square cross-section that is incorporated into the back of the mirror seat 62. The engagement portion 74 has four sides 76 that are contact surfaces for the four set screws 78 that extend into the central bore 28 through tapped holes 79 in the base 12 so that the mirror 5 may be deflected, to adjust for minor misalignments as discussed below.

An array housing 80 has a central cavity 82 extending axially inward from an outer end 84 and intersecting a truncated portion 86. This truncated portion 86 has a flat surface 88 for positioning a plate 90 (shown in FIG. 5 as a six position precision fiber aligner made of molybdenum) having a plurality of channels 92 arranged to form the converging linear array 6 for positioning the n input 1 and m output 2,3 optical waveguides.

The waveguides of this embodiment are optical fibers 93 that are passed through the central cavity 82 and bonded into respective channels 92 of the plate 90. The plate 90 is bonded to the flat surface 88 so that the input waveguide 1 is close to the optical center of the system. It would also be possible to use silicon-bench technology incorporating planar waveguides to form the converging array and coupling the optical fibers or other optical devices to the planar waveguides.

The housing 80 has a bearing surface 94 sized for a close sliding fit along the array end 22 of the central bore 26. Included along the bearing surface 94 are two circumferential glue rings 96 and a circumferential recess 100 therebetween. The recess 100 is engaged by set screws 102 to longitudinally position the housing 80 within the base 12, and therefore the waveguides 1,2,3, within the central bore 26.

The base 12, the refractive element housing 30, the pedestal 64 and the array housing 80 are manufactured from magnetic stainless steel. This material possess the important characteristic of having reasonable thermal stability so that once the positions of the optical elements are set, in the manner described below, the relationship will remain as the switch is used in various environments. Other thermally stable materials, such as Invar or Titanium, may also be used.

Assembly and set-up of the switch is accomplished by bonding the concave reflective element 5 to the seat 62. The pedestal 64 is then inserted into the central bore 28 of the base 12 until the end flange 66 contacts the reflector end 24 of the base 12. Each set screw 78 is then lightly tightened against respective the contact surfaces 76. Adhesive 104 is then forced in a glue hole 106 in the top 14 of the base 12 until the adhesive 104 escapes from a corresponding bleed hole 106a in the bottom 16 of the base 12 indicating that the annular volume defined by the glue ring 96 and the central bore 26 is full of adhesive 104.

The refractive element 4 is bonded to the legs 32,34 within the opening 38 of the refractive element housing 30. The housing 30, including pivot pins 42, is placed within the switch cavity 28 and the jewel pivot bearings 43 are inserted into holes 44 of the base 12, pivotally capturing the pins 42 of the housing 30 therebetween. The spring 58 attached to the arm 60 of the actuator 56 is attached to stop arm 48 through hole 54.

The final set-up of the switch 10 is through the use of active alignment techniques. With the pedestal 64 inserted into the switch housing 12 and bonded into place, the array housing 80 is nominally positioned in the switch housing 12 and the screws 50 are positioned so that the refractive plate 32 has approximately the correct angular positions corresponding to the output waveguides. The actuator 56 is then energized so that the refractive element 4 is held at the end of its travel which is to correspond to the first angular position. The set screws 78 that adjust the position of the mirror 5 are then adjusted for maximum thru-put of the desired waveguide.

Next, the actuator 56 is de-energized so that the refractive plate 5 is held in another angular position. The set screw 50 corresponding to this angular position is then adjusted until light is coupled into the waveguide corresponding to this second waveguide position. If no such position can be found, or if there is insufficient coupling, the housing 80 is rotated slightly and the above steps are repeated. Once the components are positioned so that the desired coupling occurs between the input waveguides and the output waveguides the set screws 102 are tightened and the glue rings 96 are filled with adhesive 104 by way of glue hole 108 and glue bleed hole 108a in the method described above.

It will be appreciated that the present invention has significant advantages for the switching of an optical signal, and in particular a single mode optical signal, between an input waveguide and a plurality of output waveguides. It should be recognized than the above-described embodiments constitute the presently preferred form of the invention and that the invention may take numerous other forms, such as but not limited to those alternatives discussed above. Accordingly, the invention should be only limited by the scope of the following claims.

We claim:

1. An optical switch for altering the path of an optical signal, comprising:
   a fixed-position concave reflector;
   a fixed array of optical waveguides facing the concave reflector, said array including an input waveguide for transmitting the optical signal into the switch, a first output waveguide and at least a second output waveguide, said output waveguides adapted to receive the optical signal;
   a refractive element having parallel planar major surfaces and an axis parallel to said major surfaces, said refractive element located between the reflector and the array of optical waveguides and having a first angular position where the optical signal transmitted into the switch passes through the switch into the first output waveguide and a second angular position where the optical signal transmitted into the switch passes through the switch into the second output waveguide; and
   an actuator connected to the refractive element for pivoting the refractive element about the axis between the first angular position and the second angular position.

2. The optical switch of claim 1, where the refractive element is a plate of optical glass.

3. The optical switch of claim 1, where the major surfaces of the refractive element are coated with an anti-reflection coating.

4. The optical switch of claim 1, wherein the waveguides are optical fibers.

5. The optical switch of claim 4, wherein the waveguides are located in a converging planar array.

6. An optical switch for altering the path of an optical signal, comprising:
   a base having a reflector end and an array end;
   a fixed-position concave reflector facing the array end of the base;
   a fixed array of optical waveguides located at the array end of base and facing the concave reflector, said array including an input waveguide for transmitting the optical signal into the switch, a first output waveguide and at least a second output waveguide, said output waveguides adapted to receive the optical signal;
   a refractive element having parallel major surfaces and an axis parallel to the major surfaces, the refractive element located between the reflector and the array of optical waveguides and having a first angular position where the optical signal transmitted into the switch passes through the major surfaces of said refractive element and is reflected back through said refractive element by the reflector into the first output waveguide and a second angular position where the optical signal transmitted into the switch passes through the major surfaces of said refractive element and is reflected back through said refractive element a second time by the reflector into the second output port; and an actuator connected to the refractive element for pivoting the refractive element about the axis between the first angular position and the second angular position.

7. An optical switch for altering the path of an optical signal, comprising:

a fixed-position concave reflector;

a fixed array of optical waveguides facing the concave reflector, said array including n number of input waveguides for transmitting the optical signal into the switch, and m number of output waveguides adapted to receive the optical signal;

a refractive element having parallel major surfaces and an axis parallel to the major surfaces, the refractive element located between the reflector and the array of optical waveguides having a plurality of angular positions for selectively coupling one of the n number of input waveguides with one of the m number of output waveguides; and an actuator connected to the refractive element for rotating the refractive element about the axis between angular positions.

* * * * *